(12) United States Patent
Keenan

(10) Patent No.: US 11,712,646 B1
(45) Date of Patent: Aug. 1, 2023

(54) TOP LOADING FILTER ASSEMBLY

(71) Applicant: Andrew D. Keenan, Southwick, MA (US)

(72) Inventor: Andrew D. Keenan, Southwick, MA (US)

( * ) Notice: Subject to any disclaimer, the term of this patent is extended or adjusted under 35 U.S.C. 154(b) by 62 days.

(21) Appl. No.: 17/449,496

(22) Filed: Sep. 30, 2021

Related U.S. Application Data

(60) Provisional application No. 63/086,112, filed on Oct. 1, 2020.

(51) Int. Cl.
*B01D 35/30* (2006.01)
*B01D 29/31* (2006.01)
*B01D 29/96* (2006.01)

(52) U.S. Cl.
CPC ........... *B01D 35/306* (2013.01); *B01D 29/31* (2013.01); *B01D 29/96* (2013.01); *B01D 2201/301* (2013.01); *B01D 2201/4092* (2013.01)

(58) Field of Classification Search
CPC ...... B01D 35/306; B01D 29/31; B01D 29/96; B01D 2201/301; B01D 2201/4092
See application file for complete search history.

(56) References Cited

U.S. PATENT DOCUMENTS 6,966,305 B2 * 11/2005 Aubree ................ F02M 37/103
123/497

* cited by examiner

*Primary Examiner* — Waqaas Ali
(74) *Attorney, Agent, or Firm* — Debora H Basile

(57) ABSTRACT

A top loading filter assembly comprising a fuel return tube displacement subassembly which is received by a mount and which is in operable communication with a filter controller having a center manifold. The subassembly comprises a fuel return tube disposed within a chamber of a manifold, and which moves in a linear direction within the chamber by a rack-and-gear mechanism. The fuel return tube is retracted and cleared from the center manifold to allow for the upward removal of the manifold from the center manifold. The manifold holds a filter cartridge; therefore, removal of the manifold via the retraction of the fuel return tube allows for the accompanying removal of the filter cartridge from the assembly. The assembly may comprise one or more fuel return tube displacement subassemblies.

15 Claims, 14 Drawing Sheets

TOP LOADING FILTER ASSEMBLY

BACKGROUND OF THE INVENTION

1. Field of the Invention

The present invention relates generally to single and multiple filter assemblies, and more particularly to fuel filter systems.

2. Background of the Invention

FIGS. 1 and 2 depict an exemplary prior art filter assembly typically used in the marine, aviation, and industrial industries and commonly referred to as a bottom loading assembly. Referring to FIGS. 1 and 2, an exemplary bottom loading assembly 10 comprises a locking ring collar 12 which attaches a lower filter housing 14 to a filter head 16 with a plurality of bolts 18. When fully assembled and operating, filter head 16 is fixedly secured to a structure. When it is time to replace a filter cartridge 20, which is contained within lower filter housing 14, maintenance personnel must drain the fuel from lower filter housing 14, hand loosen bolts 18, rotate, and lower filter housing 14 in the direction of the arrow so that filter housing 14 is no longer physically associated with filter head 16. Cartridge 20 may then be drawn out from filter head 16 and then a new cartridge may be placed within filter head 16. With a new cartridge 20 installed, lower filter housing 14 may be raised and rotated into position on locking ring collar 12 and hand tightened by evenly torqueing bolts 18.

Due to the design of the prior art filter housings, the cartridge must be replaced from the bottom which has proven difficult and cumbersome. Not only is replacement messy, as fuel commonly drips from the assembly during the replacement, but there is also very little space between the floor and the filter housing thereby giving maintenance personnel a limited amount of room in which to maneuver the filter housing relative to the fixed filter head during the cartridge replacement process. Additionally, when replacing filters via conventional bottom loading methods, because the housing is drained prior to removal of the cartridge, it must be filled to remove the air; otherwise, the engine is likely to have functional gaps. When using this type of filter as a prefilter will require appositive fuel pressure to purge the air out of the housing.

Another disadvantage of prior art filter housings is that they do not allow for removal of a filter from the housing while the engine is running. This is the fact even where multiple filter housings are incorporated into the use of the filter controller.

BRIEF SUMMARY OF THE INVENTION

The above-mentioned problems are removed or alleviated by a top loading filter assembly comprising a first and a second manifold, each of which is removable from the top, secured to a center manifold. Each of the first and the second manifolds has a fuel return tube which is moved in a linear direction by a rack and gear mechanism. Via this mechanism, each of the fuel return tubes may be retracted and thereby cleared from the center manifold to thereby allow for the upward removal of the manifolds from the center manifold. A filter is engaged with each of the first and the second manifolds and, when in use, is disposed in a filter housing which may be integrally formed with the center manifold. Accordingly, when the first and the second manifolds are removed from the center manifold, the upward movement of the first and the second manifolds draws the respective filter cartridge out from a respective filter housing, thereby allowing for the easy removal of the cartridge from the assembly.

When the assembly is fully operational, the first and second manifolds are secured to the center manifold such that the fuel return tube of the first manifold is coupled to a first collar located in the center manifold and the fuel return tube of the second manifold is coupled to a second collar. In this position, the fuel return tubes are extended via a rack-and-gear mechanism. A first filter, which is engaged with the first manifold is disposed within a first filter housing, and a second filter which is engaged with the second manifold is disposed within a second filter housing. In this position, fuel can pass unobstructed through the filters and the fuel return tubes.

These and other features and advantages of the present invention will be more fully understood from a reading of the following detailed description with reference to the accompanying drawings.

DETAILED DESCRIPTION OF THE INVENTION

For purposes of understanding the inventive top loading filter assembly disclosed herein, discussion shall be made with its application to a prefilter fuel system which is typically found in, e.g., marine, aviation, and industrial fuel systems. However, the top loading filter assembly is not to be limited to such use. Rather, it is contemplated that the top loading filter assembly may be compatible with a variety of fuel systems as would be readily understood and appreciated by a person of ordinary skill in the art.

Figure 1:
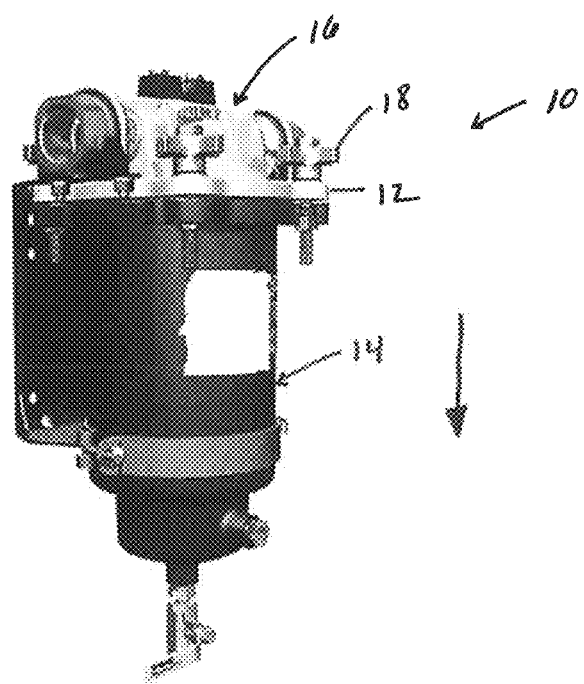
FIG. 1 is a schematic depicting a prior art filter assembly.
Figure 2:
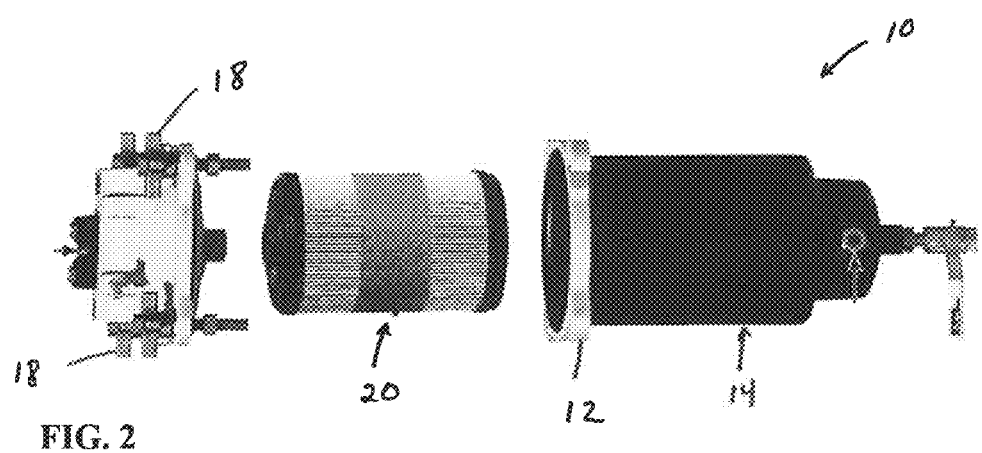
FIG. 2 is a schematic depicting an exploded view of the filter assembly depicted in FIG. 1.
Figure 3:
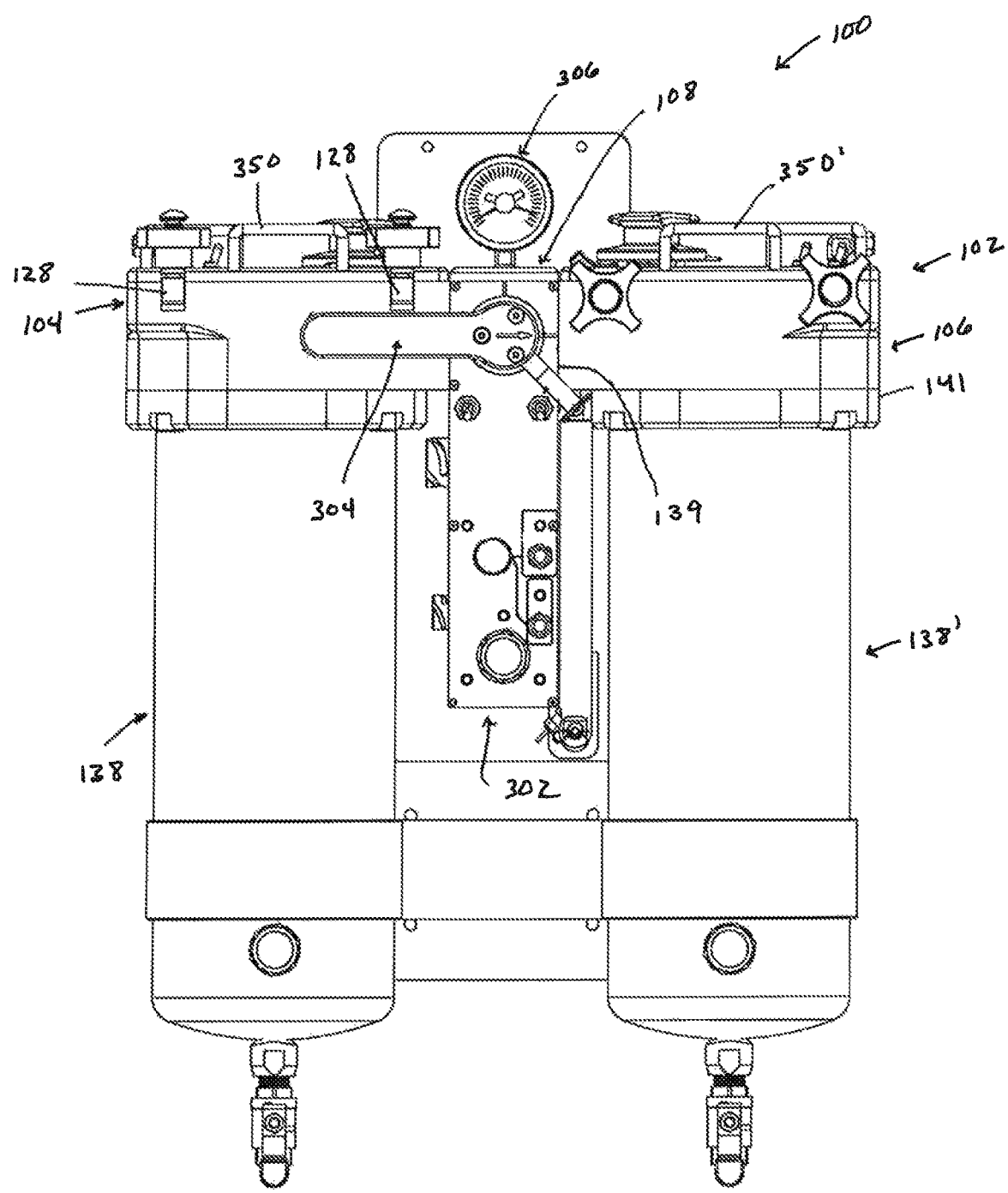
FIG. 3 is a schematic depicting a front view of an exemplary top loading filter assembly.
Figure 4:
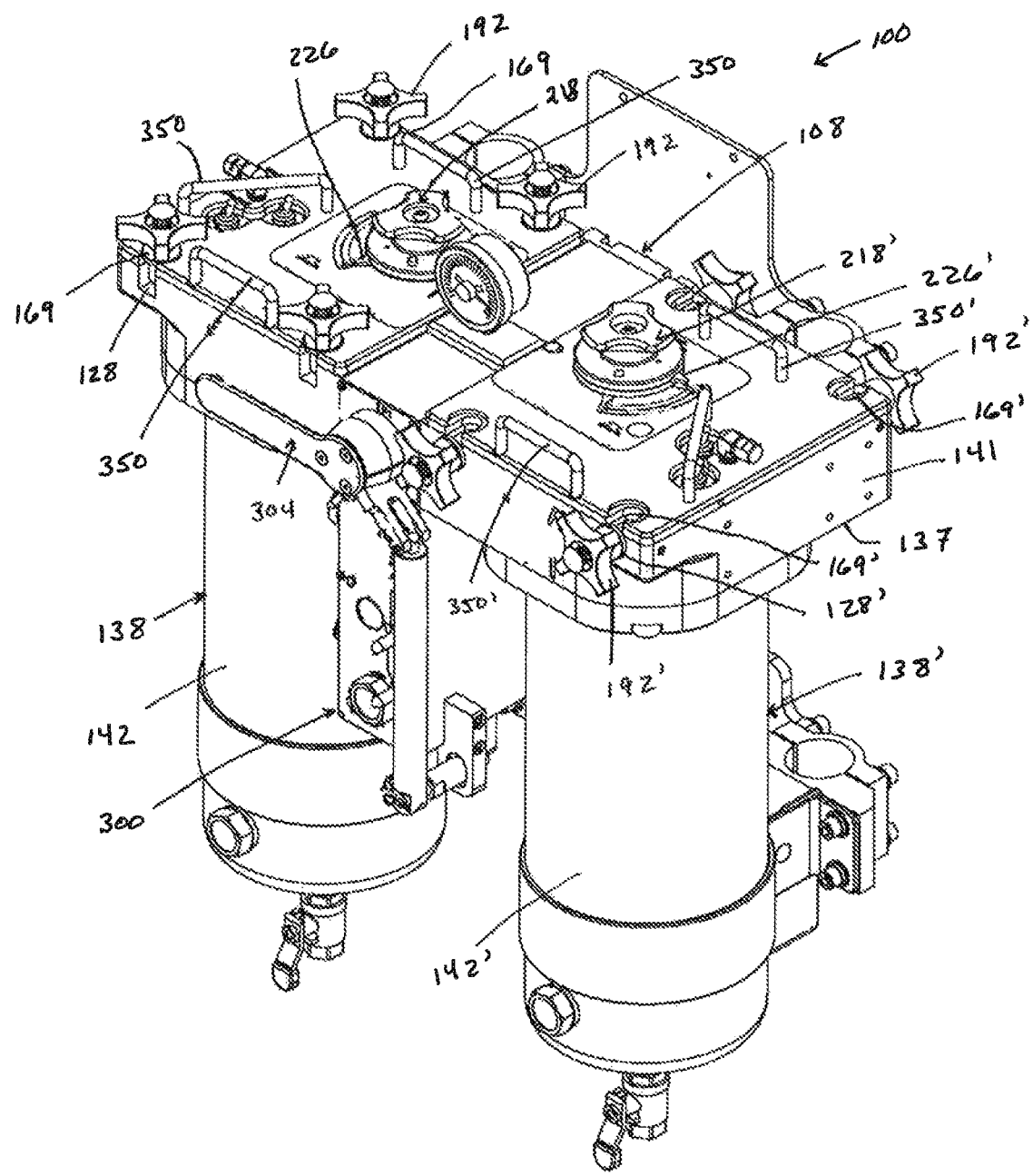
FIG. 4 is a schematic depicting an elevational view of the top loading filter assembly depicted in FIG. 3.
Figure 5:
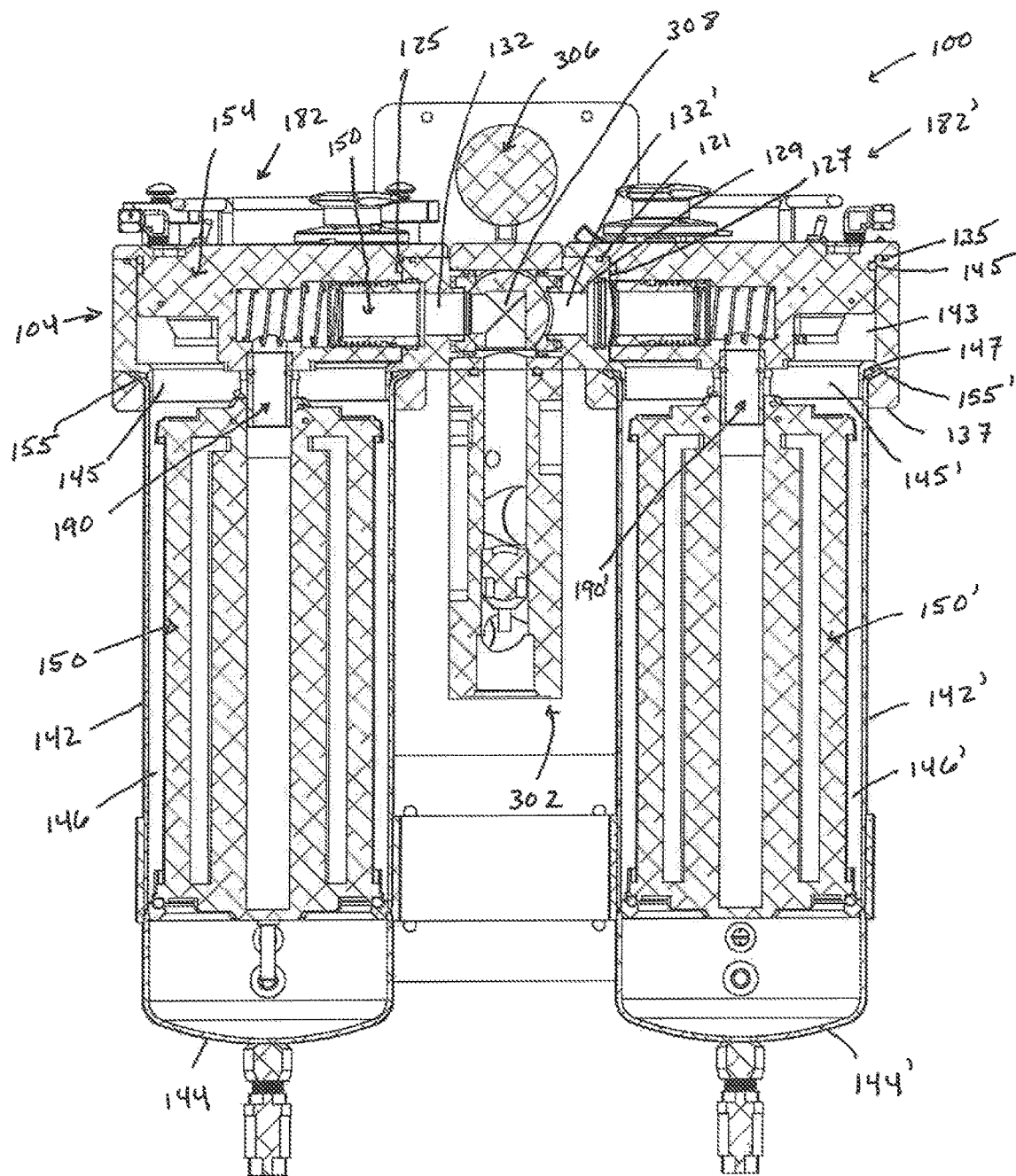
FIG. 5 is a schematic depicting an exemplary proximal member of an exemplary mount and an exemplary first manifold of the top loading filter assembly depicted in FIG. 3.

Referring to FIGS. 3-5, an exemplary top loading filter assembly 100 comprises a mount 102. Mount 102 includes a proximal member 104, a distal member 106, and a medial member 108, wherein medial member 108 is located, and preferably formed, between proximal and distal members 104 and 106.

Figure 7:
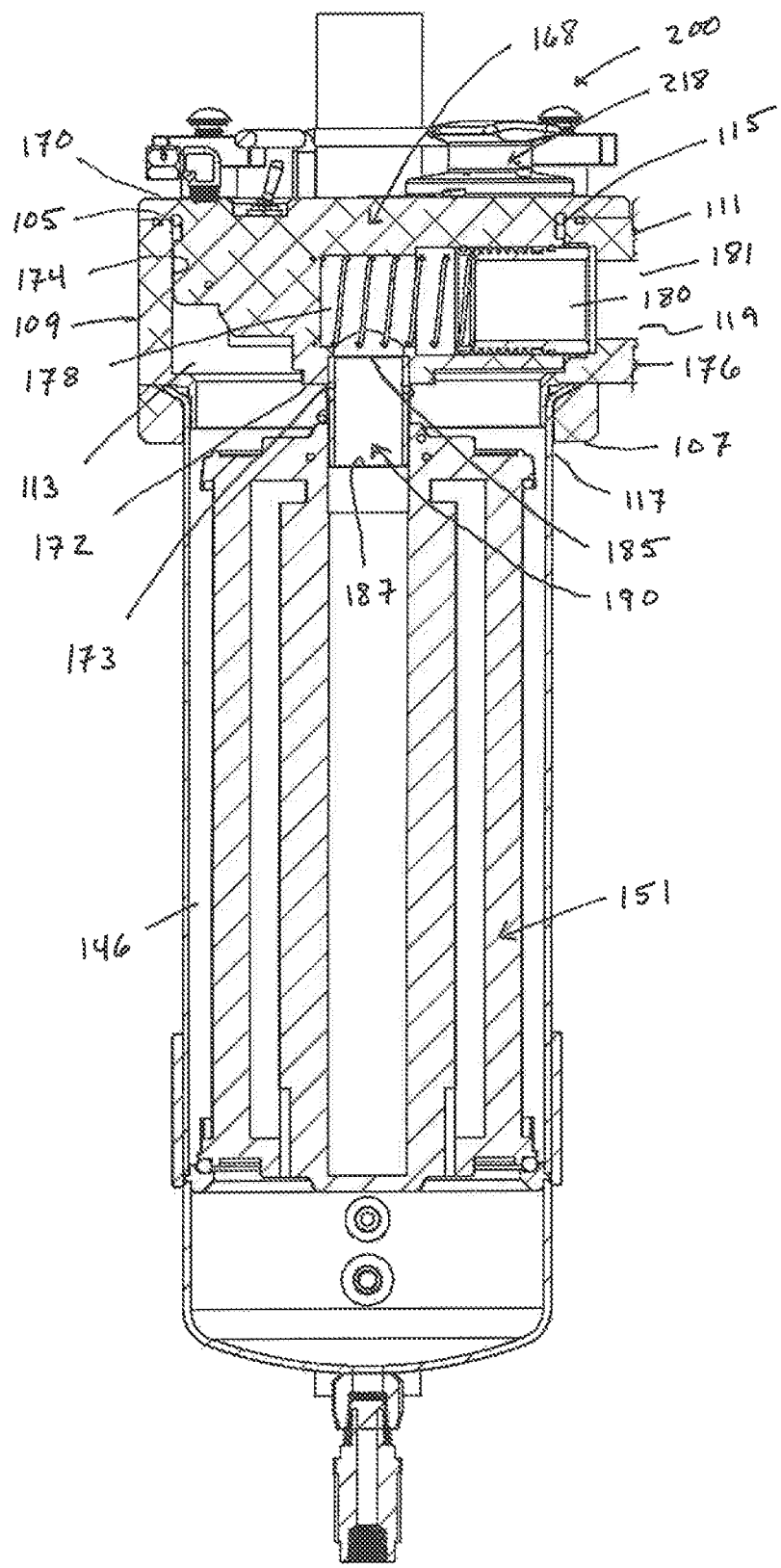
FIG. 7 is a schematic depicting a cross-sectional view of an anterior portion of the top loading filter assembly depicted in FIG. 3.

As best shown in FIG. 7, proximal member 104 comprises a top wall 105 oppositely situated to a bottom wall 107, and a proximal wall 109 oppositely situated to a distal wall 111. Proximal member 104 further comprises a chamber 113 which is surrounded by top wall 105, bottom wall 107, proximal wall 109 and distal wall 111, wherein chamber 113 is accessible by an opening 115 formed on top wall 105, by an opening 117 formed on bottom wall 107, and by an opening 119 formed on distal wall 111.

Referring to FIG. 5, medial member 108 comprises a top wall 121 oppositely situated to a bottom wall 123, and a proximal wall 125 oppositely situated to a distal wall 127. Medial member 108 further comprises a chamber 129 which is surrounded by top wall 121, bottom wall 123, proximal wall 125 and distal wall 127, wherein chamber 129 is accessible by an opening 131 formed on bottom wall 123, by an opening 133 formed on proximal wall 125, and by an opening 135 formed on distal wall 127.

Referring to FIGS. 3-5, distal member 106 comprises a top wall 135 oppositely situated to a bottom wall 137, and a proximal wall 139 oppositely situated to a distal wall 141. Distal member 104 further comprises a chamber 143 which is surrounded by top wall 135, bottom wall 137, proximal wall 139, and distal wall 141, wherein chamber 143 is accessible by an opening 145 formed on top wall 135, by an opening 147 formed on bottom wall 137, and by an opening 151 formed on proximal wall 139.

As best shown in FIGS. 3 and 4, mount 102 further comprises a plurality of fastening holes 128 located within proximal member 104 and a plurality of fastening holes 128' located within distal member 106.

Figure 6:
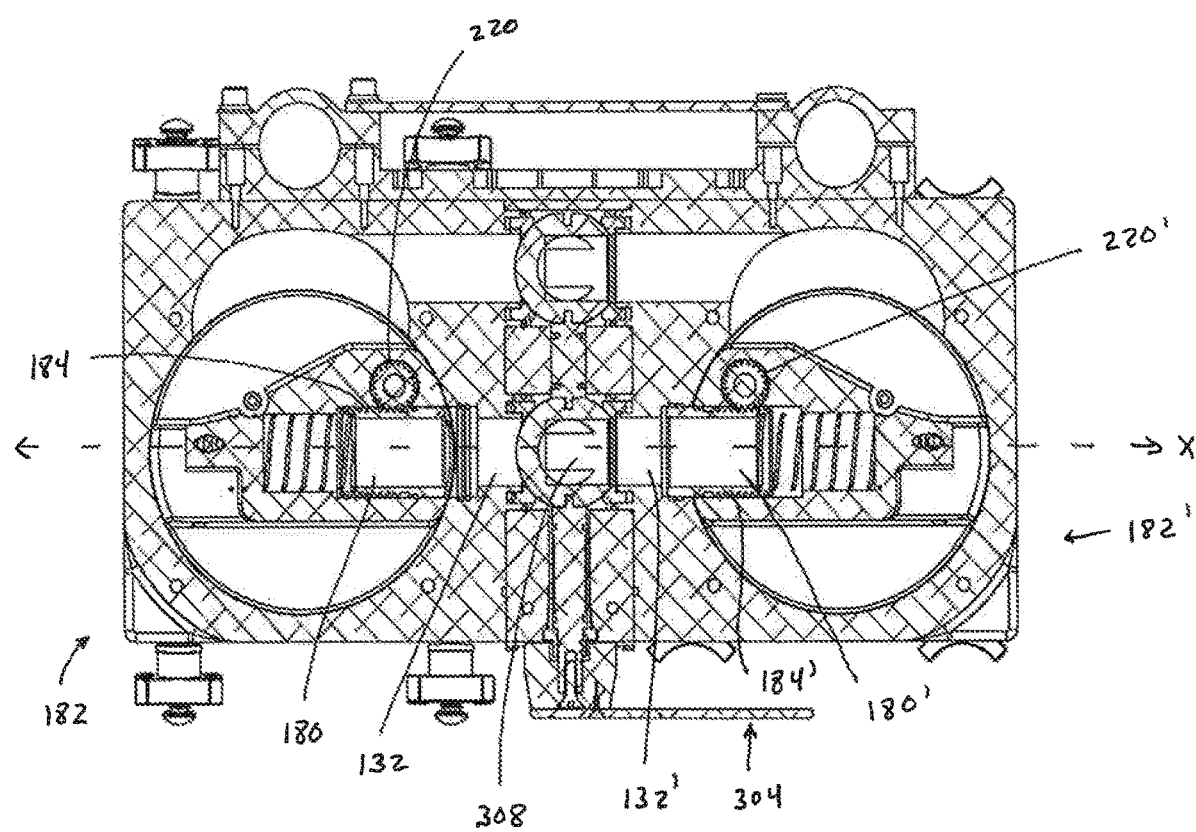
FIG. 6 is a schematic depicting a longitudinal view of the exemplary top loading filter assembly depicted in FIG. 3.

Referring to FIGS. 5 and 6, top loading filter assembly 100 further comprises a hollow, generally cylindrically shaped collar 132 and a hollow, generally cylindrically shaped collar 132', wherein collar 132 is disposed within chamber 129 of medial member 108 of mount 102 towards proximal wall 125, and collar 132' is disposed within chamber 129 of medial member 108 of mount 102 towards distal wall 127.

Referring to FIGS. 3-5, assembly 100 further comprises a first filter housing 138 and a second filter housing 138'. Each of first and second filter housings 138 and 138' respectively has a generally cylindrical shaped body 142 and 142', wherein body 142 is engaged with proximal member 104 of mount 102 and body 142' is engaged with distal member 106 of mount 102. A cavity 146 and 146' is respectively formed within body 142 and 142'. Each of bodies 142 and 142' respectively comprises an anterior end 155 and 155' oppositely situated to a posterior end 144 and 144', wherein anterior ends 155 and 155' are respectively directed towards mount 102. Each of anterior ends 155 and 155' has openings 145 and 145' respectively formed therethrough, wherein opening 145 is in fluid communication with cavity 146 and opening 145' is in fluid communication with cavity 146'. Anterior end 155 is preferably contiguously formed with proximal member 104 of mount 102 and longitudinally extends past bottom wall 107 of proximal member 104 of mount 102, and anterior end 155' of body 142' is contiguously formed with distal member 106 of mount 102 and longitudinally extends past bottom wall 137 of distal member 106 of mount 102.

Referring to FIGS. 3-14b, top loading filter assembly 100 further comprises a first fuel return tube displacement subassembly 182 and a second fuel return tube displacement subassembly 182'. As best shown, e.g., in FIGS. 5 and 7, first fuel return tube displacement subassembly 182 comprises a first manifold 154, a filter engaging member 190, a filter cartridge 150, a fuel return tube 180, and an actuating system 200.

Referring to FIGS. 5-7 and 10, first manifold 154 comprises a main body 168 defined by a top side 170 oppositely situated to a bottom side 172, and a proximal side 174 oppositely situated to a distal side 176. Bottom side 172 has an opening 173 formed therethrough, and distal side 176 has an opening 181 formed therethrough. Sides 170, 172, 174, and 176 surround a chamber 178, wherein openings 173 and 181 are in fluid communication with chamber 178. Top side 170 of main body 168 of first manifold 154 further comprises a plurality of cutouts 169 formed therethrough. Top side 170 of main body 168 of first manifold 154 further has a knob opening 186 and a generally arcuate shaped opening 152 formed therethrough wherein opening 152 has a first terminal end 156 oppositely situated to a second terminal end 158.

Figure 9:
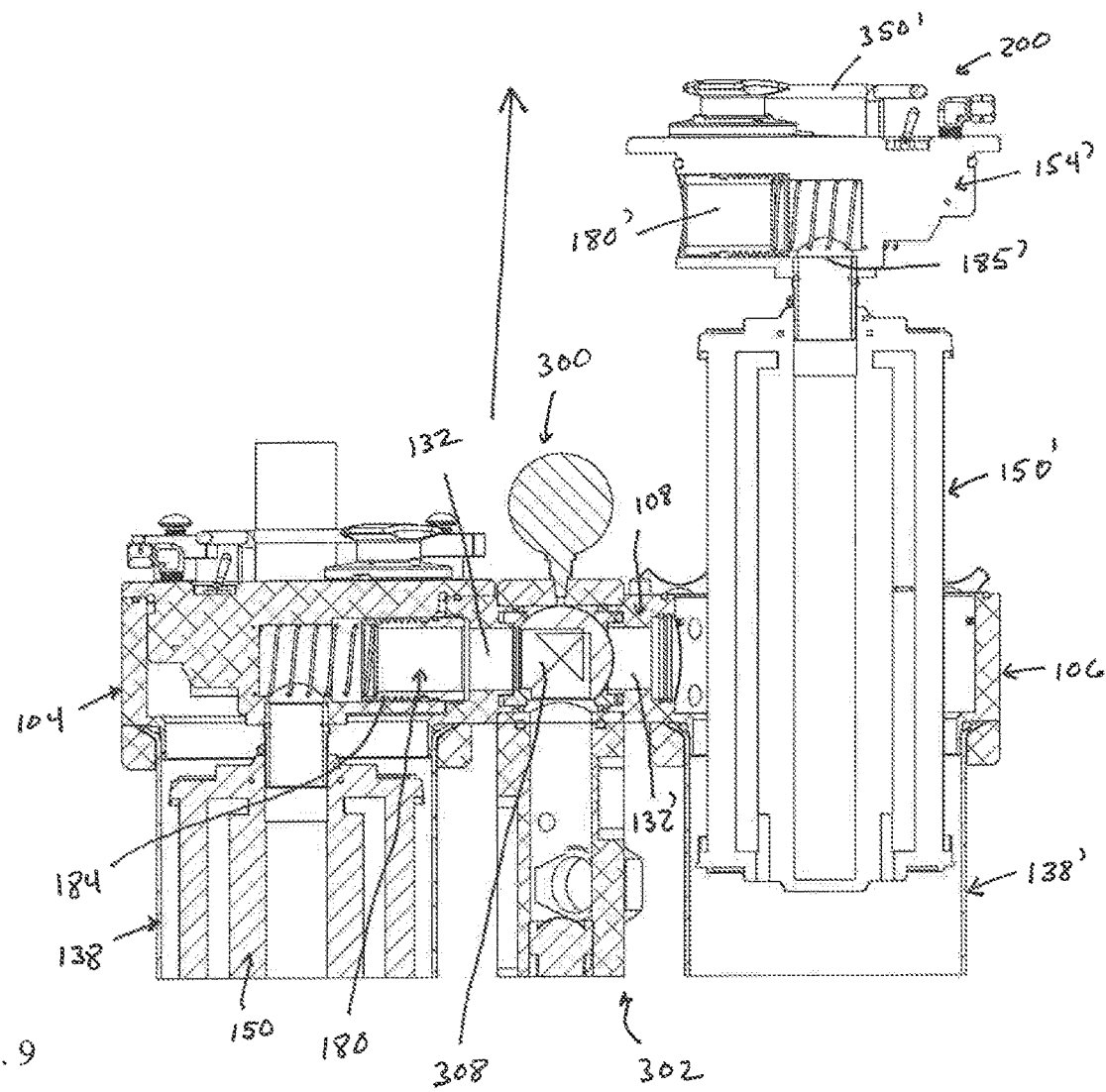
FIG. 9 is a schematic depicting the removal of the second fuel return tube displacement subassembly depicted in FIG. 8.

Referring to FIG. 9, fuel return tube 180 of subassembly 182 is disposed within chamber 178 of main body 168 of first manifold 154. Fuel return tube 180 comprises a hollow, generally cylindrical shaped body having a corrugated exterior 184 which forms a series of alternating ridges and grooves.

Referring to FIG. 7, filter engaging member 190 of subassembly 182 has an anterior end 185 which extends through opening 173 of bottom side 172 of main body 168 of first manifold 154, and an oppositely directed posterior end 187 which secures filter cartridge 150 to main body 168 of first manifold 154.

Figure 8:
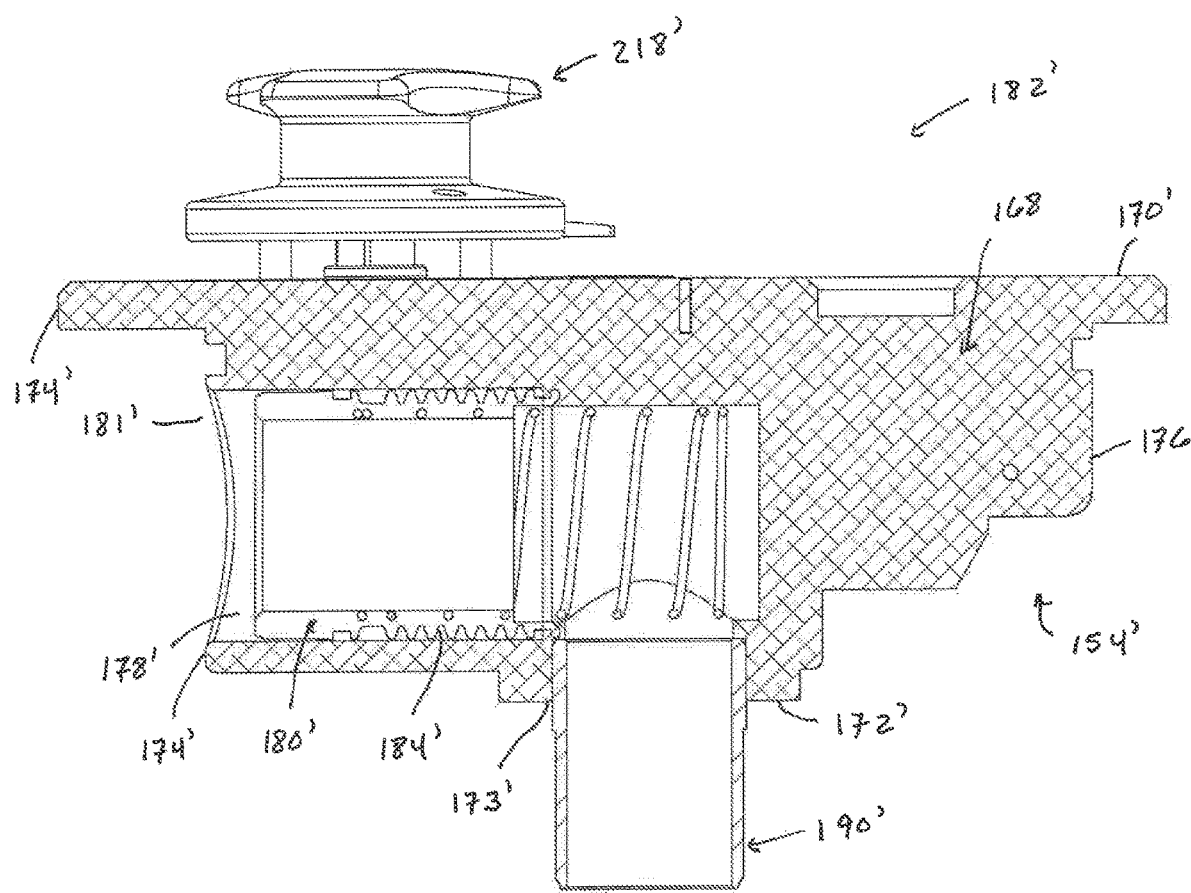
FIG. 8 is a schematic depicting an exemplary second fuel return tube displacement subassembly of the assembly depicted in FIG. 3, wherein an exemplary fuel return tube of the subassembly is shown in a retracted position.

Referring to FIGS. 8 and 9, second fuel return tube displacement subassembly 182' comprises a second manifold 154', a filter engaging member 190', a filter cartridge 150', and an actuating system 200'.

Figure 10:
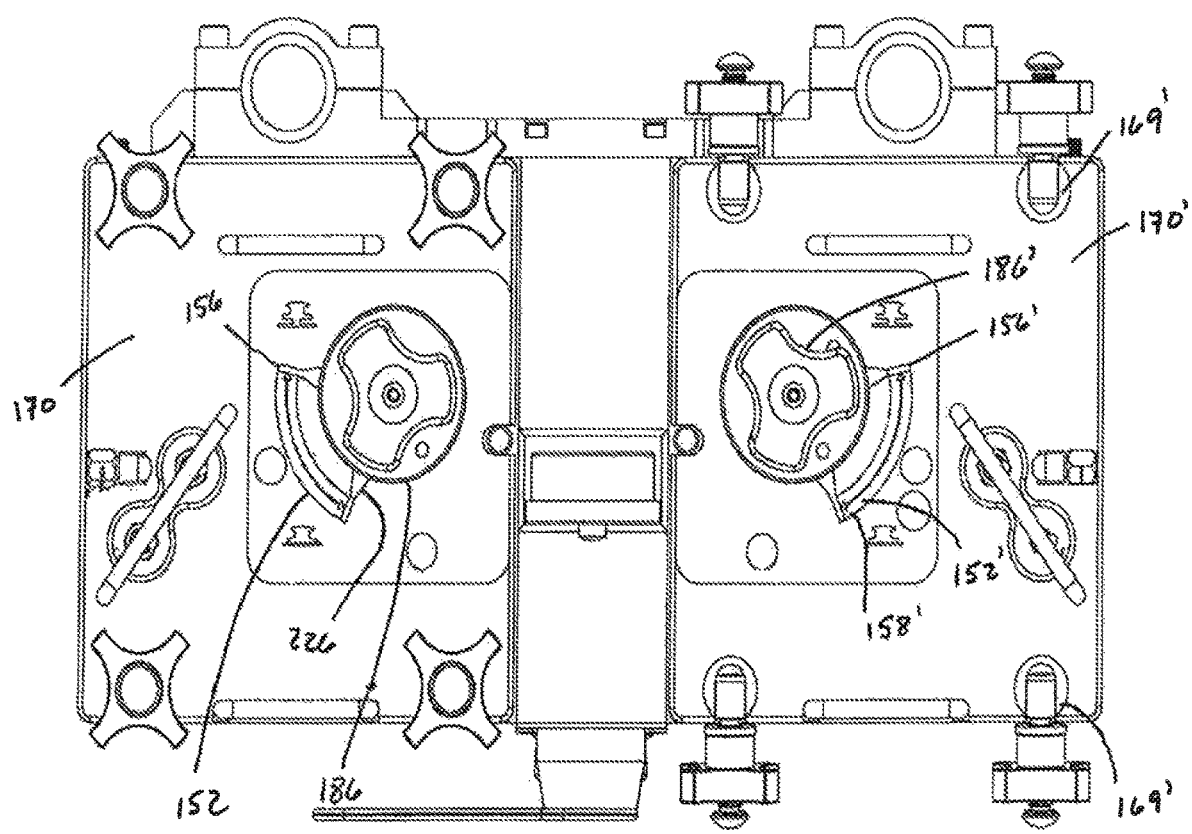
FIG. 10 is a schematic depicting a planar view of an anterior side of the top loading filter assembly depicted in FIG. 3.
Figure 11:
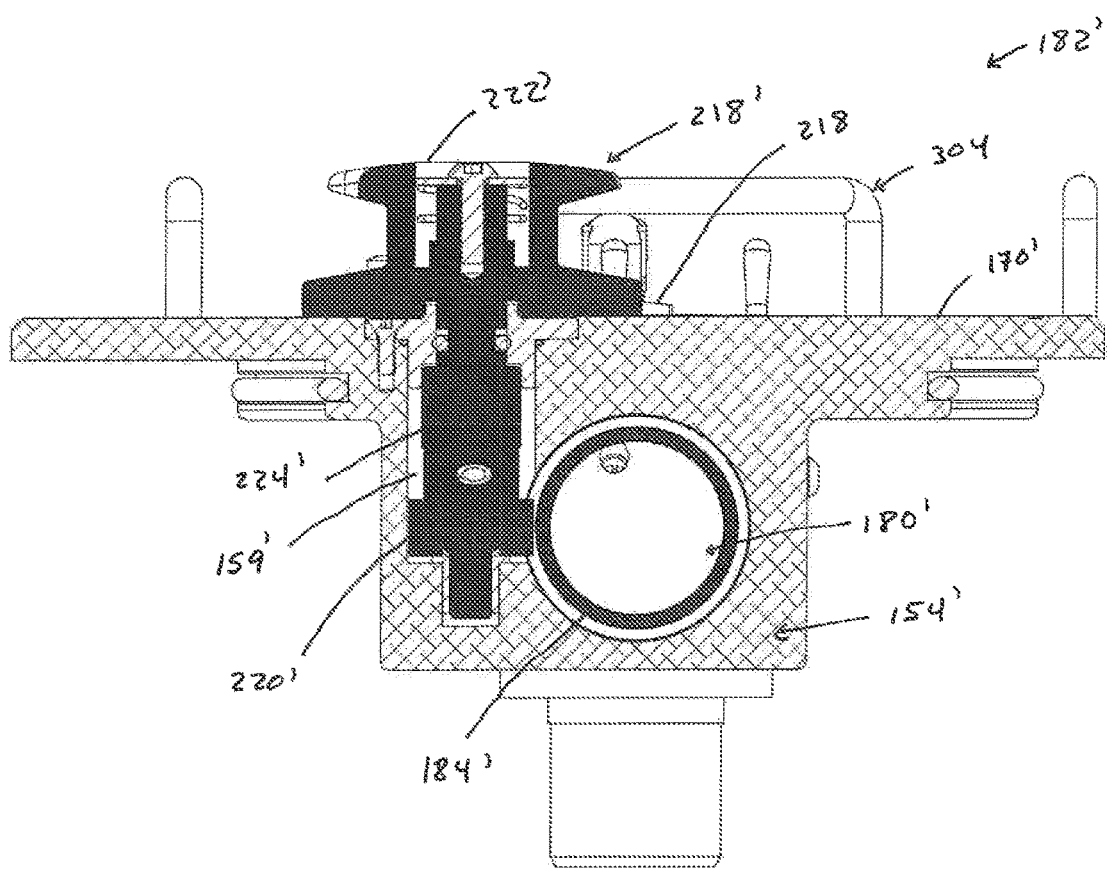
FIG. 11 is a schematic depicting a longitudinal view of the second fuel return tube displacement subassembly depicted in FIG. 8.

As best shown in FIG. 8, e.g., second manifold 154' of second fuel return tube displacement subassembly 182' comprises a main body 168' defined by a top side 170' oppositely situated to a bottom side 172' and a proximal side 174' oppositely situated to a distal side 176'. Bottom side 172' has an opening 173' formed therethrough, and proximal side 174' has an opening 181' formed therethrough. Sides 170', 172', 174', and 176' surround a chamber 178', wherein openings 173' and 181' are in fluid communication with chamber 178'. Referring to FIG. 10, top side 170' of main body 168' of second manifold 154' further comprises a plurality of cutouts 169' formed therethrough. Top side 170' of main body 168' of second manifold 154' further has a knob opening 186' and a generally arcuate shaped opening 152' formed therethrough wherein opening 152' has a first terminal end 156' oppositely situated to a second terminal end 158'.

Referring to FIGS. 6, 8, and 9, fuel return tube 180' of subassembly 182' is disposed within chamber 178'. Fuel return tube 180' comprises a hollow, generally cylindrical shaped body having a corrugated exterior 184' which forms a series of alternating ridges and grooves.

Filter engaging member 190' of subassembly 182' has an anterior end 185' which extends through opening 173' of bottom side 172' of main body 168' of second manifold 154', and an oppositely directed posterior end 187' which secures filter cartridge 150' to main body 168' of second manifold 154'.

Figure 12:
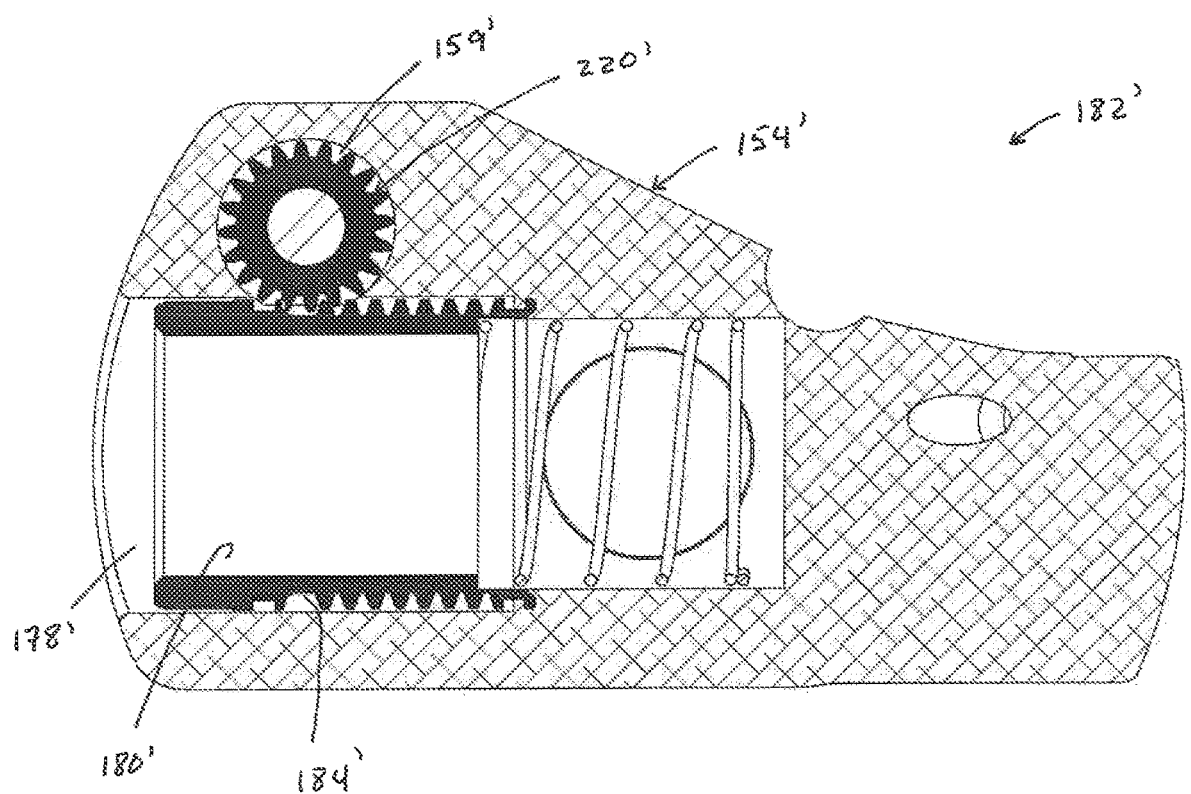
FIG. 12 is a schematic depicting a cross-sectional view of the second fuel return tube displacement subassembly depicted in FIG. 8.
Figure 13:
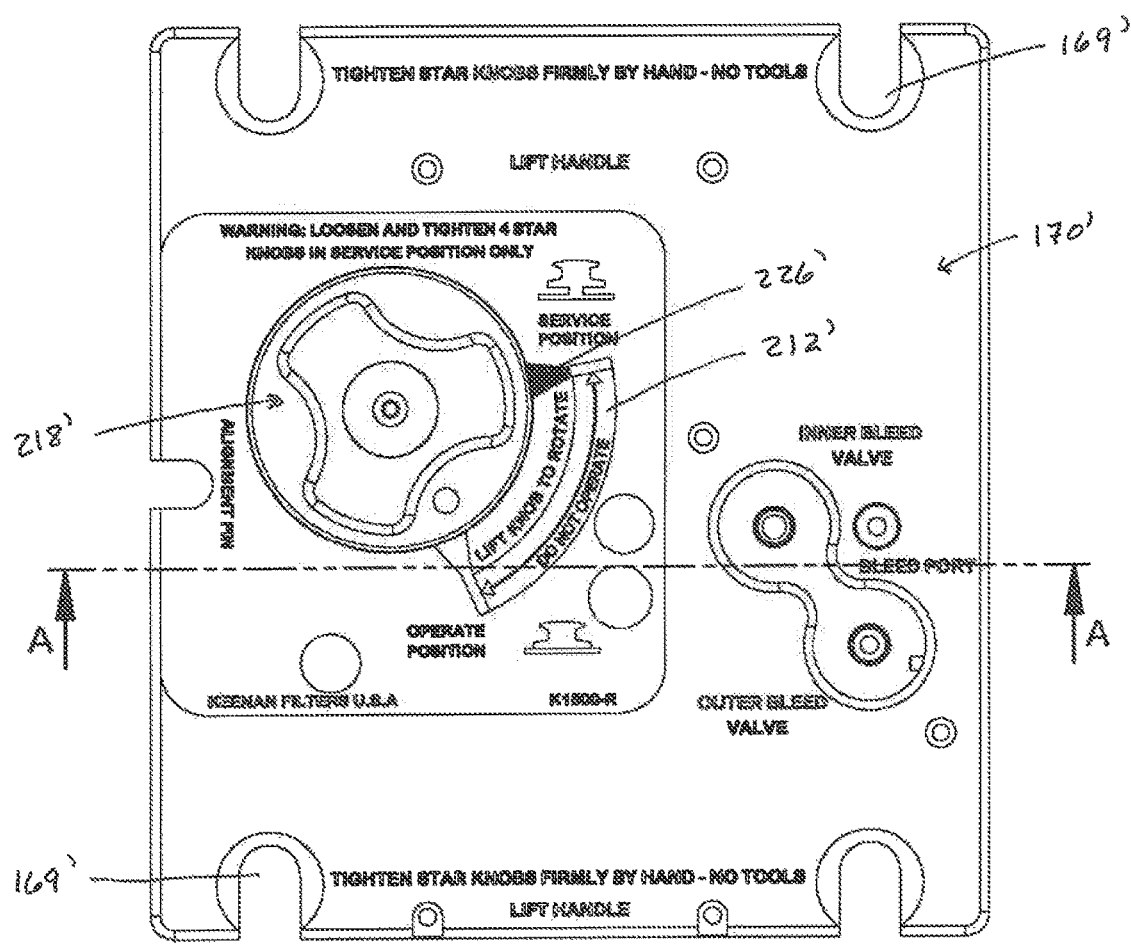
FIG. 13 is a schematic depicting a top planar view of the second fuel return tube displacement subassembly depicted in FIG. 8 in an extended position.

Each of actuating systems 200 and 201' of respective first and second fuel return tube displacement subassemblies 182 and 182' respectively comprises knobs 218 and 218' (see, e.g., FIG. 4) and pinions 220 and 220' (see, e.g., FIGS. 6 and 12).

For the sake of clarity, knob 218' and pinion 220', and their interaction with components second fuel return tube displacement subassembly 182' shall be further described herein, wherein it is to be understood that knob 218 and pinion 220 work in substantially the same way with the substantially like components of first fuel return tube displacement subassembly 182.

Referring to FIGS. 9-14b, knob 218' comprises a head 222' and a shaft 224', wherein shaft 224' is received within knob opening 186' of top side 170' of main body 168' of second manifold 154' and extends into a cavity 159' formed within main body 168' of second manifold 154', wherein cavity 159' is in fluid communication with chamber 178' of main body 168' of second manifold 154' (similarly, knob 218 comprises a head 222 and a shaft 224, wherein shaft 224 is received within knob opening 186 of cover plate 202 and extends into a cavity 159 formed within main body 168 of first manifold 154, wherein cavity 159 is in fluid communication with chamber 178 of main body 168 of second manifold 154). Knob 218' further comprises a protrusion 226' that extends from head 222' and which overlies arcuate shaped opening 152' (similarly knob 218 comprises a protrusion 226 that extend from head 222 and which overlies arcuate shaped opening 152).

Pinion 220', which is secured to shaft 224' and which is contained within cavity 159' of main body 168' of second manifold 154', is aligned with the ridges and grooves of corrugated exterior 184' of fuel return tube 180' such that when fuel return tube 180' is moved through chamber 178' by means of actuating system 200', pinion 220' is physically engaged with the ridges and grooves of corrugated exterior 184'.

When knob 218' is rotated, pinion 220' rotates and engages with the ridges and grooves of corrugated exterior 184' of fuel return tube 180' thereby effectuating the movement of fuel return tube 180' along a longitudinal axis X of chamber 178' (see FIG. 6). Preferably such movement is accomplished with the assistance of spring loaded pins. In an exemplary embodiment, a user may lift and rotate head 222' in one direction thereby causing the rotation of pinion 220' which then causes the movement of return tube 180' away from collar 132' (see FIGS. 13a and 13b). In this retracted position, a user may replace filter cartridge 150' (see FIGS. 8 and 9) (note that in FIGS. 5-7 fuel return tube 180 of first manifold 154 is depicted in an extended position).

When fuel return tube 180 is in the retracted position, a user may lift and rotate head 222' in the opposite direction thereby causing the rotation of pinion 220' in the opposite direction thereby causing return tube 180' to move towards collar 132'. Rotation of knob 210 is repeated until collar 132' is engaged with fuel return tube 180' at which point subassembly 182' is in operable engagement with top loading assembly 100. Rotation of knob 218' further causes protrusion 226' to move through arcuate shaped opening 212' to thereby provide a visual indication as to the operational mode of subassembly 182'.

In an exemplary embodiment, and as best shown, e.g., in FIGS. 3-6, 9, and 10, top loading filter assembly 100 further comprises a filter control subassembly 300. In the embodiment depicted herein, filter control subassembly 300 is physically integrated with medial member 108 of mount 102. Filter control subassembly 300 comprises a lower control manifold 302, a filter selection handle 304, and a vacuum gauge 306. As would be appreciated by one of skill in the art, filter selection handle 304 actuates movement of a hollow conduit 308 so that conduit 308 is in operable communication with either collar 132 or collar 132' thereby allowing for the exchange in operability between first and second filter cartridges 150 and 150' as would be appreciated by a person of ordinary skill in the art.

Referring to FIGS. 3-14b, when top filter loading assembly 100 is fully assembled, second manifold 154' is fitted to distal member 106 of mount 102 such that main body 168' of second manifold 154' is positioned within chamber 143 of distal member 106 of mount 102 and such that fuel return tube 180' is coaxial to collar 132'. Filter cartridge 150', which is attached to filter engaging member 190', is disposed within cavity 146' of second filter housing 138'. Second manifold 154' may be secured to distal member 106 of mount 102 by aligning cutouts 169' of second manifold 154' with fastening holes 128' of distal member 106, and inserting fastening members 192' within each of the aligned cutouts 169' and fastening holes 128'.

Similarly, first manifold 154 is fitted to proximal member 104 of mount 102 such that main body 168 is positioned within chamber 113 of proximal member 104 of mount 102 and such that fuel return tube 180 is coaxial to collar 132. Filter cartridge 150, which is attached to filter engaging member 190 of first manifold 154, is disposed within cavity 146 of first filter housing 138. First 154 may be secured to proximal member 104 of mount 102 by aligning cutouts 169 of first manifold 154 with fastening holes 128 of proximal member 104, and inserting fastening members 192 within each of the aligned cutouts 169 and fastening holes 128.

FIG. 9 depicts removal of filter cartridge 150' from top filter loading assembly 100. Referring to FIGS. 5 and 9, first manifold 154 is secured to proximal member 104 of mount 102 such that fuel return tube 180 is in an extended and locked position. In this position, fuel return tube 180 is engaged with collar 132 so that fuel may uninterruptedly flow from filter cartridge 150, through filter engaging member 190, and through collar 132.

In the embodiment depicted in FIG. 5, fuel return tube 180' is disengaged from collar 132' and is in a retracted position such that fuel return tube 180' is located entirely within chamber 178'. Retraction is accomplished by rotating knob 218' such that pinion 220' engages with fuel return tube 180' and, via the resulting rack-and-gear mechanism, fuel return tube 180' retracts away from collar 132' and is cleared from medial member 108 of mount 102.

As shown in FIG. 9, once so cleared, and once disengagement of fastening members 192' from distal member 106 of mount 102 is achieved, an operator need only lift second manifold 154' in an upwards direction, as shown by the arrow, by way of e.g., handles 350' which may be integrally formed on top side 170' of second manifold 154'. This motion draws filter cartridge 150' out from top loading filter assembly 100 so that filter cartridge 150' may be easily repaired, maintained, and/or replaced.

Although movement of the fuel return tube and replacement of the filter was described with reference to fuel return tube 180' and to filter cartridge 150' of second manifold 154', the description is equally applicable to fuel return tube 180 of first manifold 154 and to filter cartridge 150.

Figure 14A:
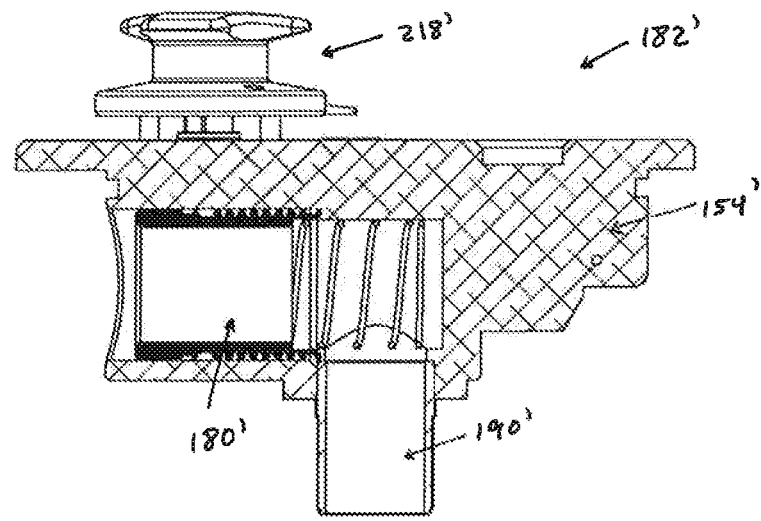
FIG. 14a is a schematic depicting a longitudinal view of the second fuel return tube displacement subassembly depicted in FIG. 8 in a retracted position.
Figure 14B:
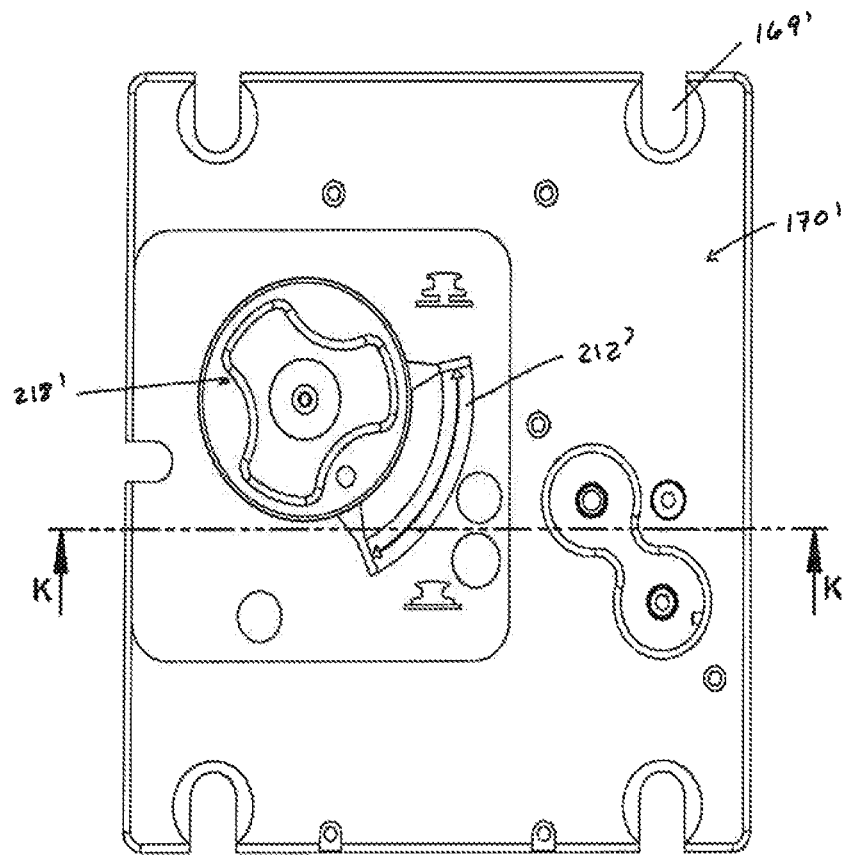
FIG. 14b is a schematic depicting a top planar view of the second fuel return tube displacement subassembly depicted in FIG. 8 in a retracted position.

Another exemplary top loading filter assembly 400 is depicted in FIG. 14. Top loading filter assembly 400 is substantially similar to top loading filter assembly 100 except, e.g., that top loading assembly 400 comprises only a single fuel return tube displacement subassembly, such as a subassembly described above with referenced to subassemblies 182 and 182', and filter control subassembly 300 is replaced by a filter control subassembly 500 as would be appreciated by a person of ordinary skill in the art.

Figure 15:
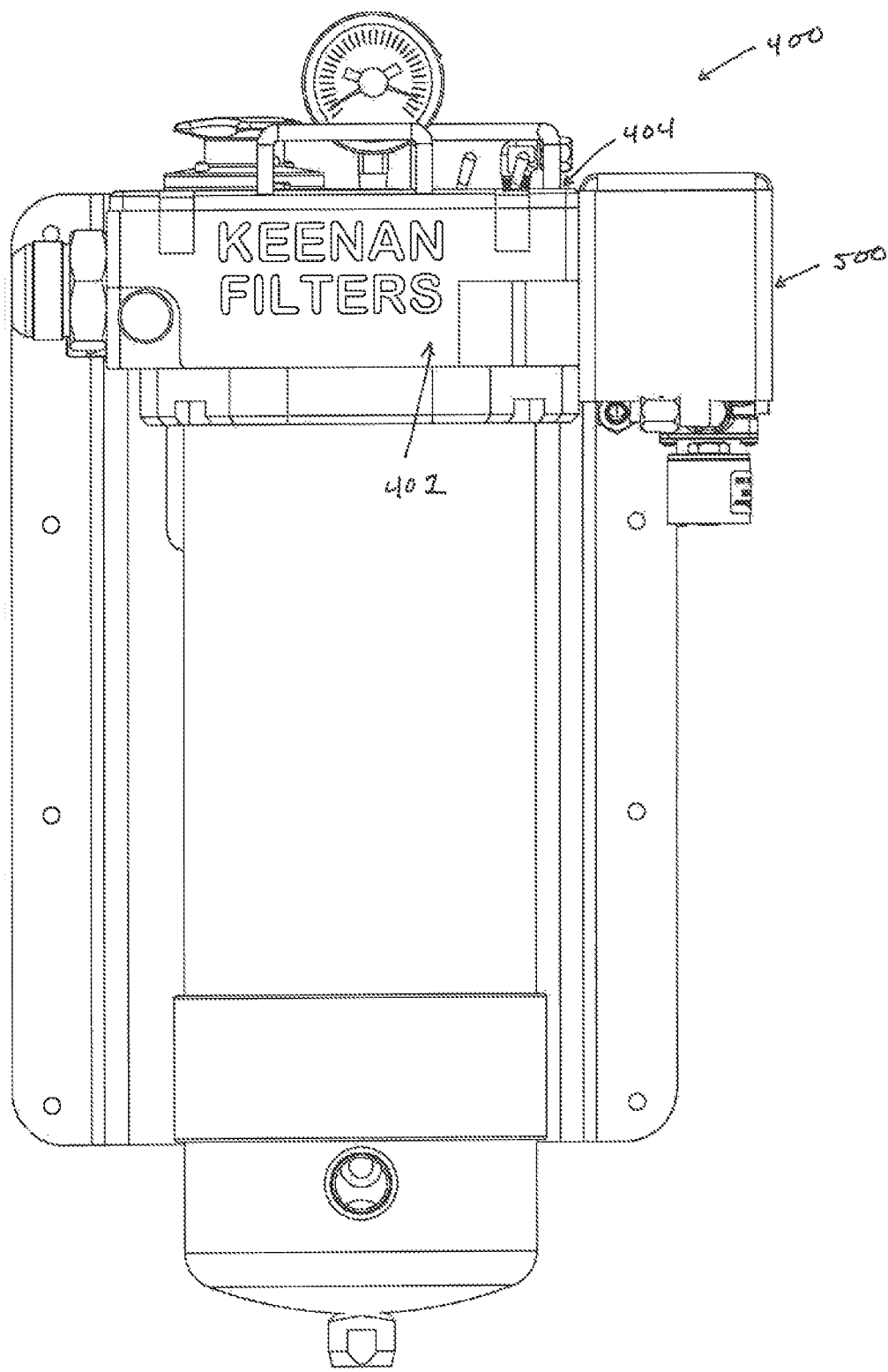
FIG. 15 is a schematic depicting a front view of another exemplary embodiment of a top loading filter assembly.

Referring to FIG. 15, top loading filter assembly 400 comprises a mount 402 being at least substantially identical in form and function to one of proximal and distal members 104 and 106. Top loading filter assembly 400 further comprises a manifold 404 which is at least substantially identical to either of proximal and second manifolds 154 and 154' in form and function, and which is arranged relative to mount 402 in at least substantially identical form to the arrangement of either of proximal and second manifolds 154 and 154' relative to mount 102.

What has been disclosed here is an assembly which solves the problems associated with changing filters from traditional fuel systems where the filters are removed from the bottom of the system rather than from the top. As detailed above, the assembly disclosed herein allows the filter to be replaced from the top of the system rather than from the bottom, i.e., from the manifold rather than from the filter housing. Accordingly, it is not necessary to drain the filter housing as is customary in the prior art when changing the filter. Rather, the filter housing remains intact and is not impacted by the filter change. Another advantage to top loading of the filter rather than bottom loading is that more room is provided to the maintenance personnel who is changing the filter. That is, the maintenance personnel need not be concerned with ramming the filter or the filter housing against the floor as generally there is ample room for filter exchanges when loading from the top as compared to loading from the bottom. Another advantage of the disclosed top loading filter assembly is that it allows, whether the assembly includes one or more filter cartridges, for the exchange or maintenance of a filter cartridge even in the case where the engine is running.

It is to be recognized that various alterations, modifications, and/or additions may be introduced into the constructions and arrangements of parts described above without departing from the spirit or ambit of the present invention. It is further noted that from a description of the various embodiments disclosed herein, it is to be understood that a top loading assembly according to the present disclosure may include one or more filter cartridges, each of which may be replaced, maintained, or repaired via the fuel return displacement subassembly disclosed herein. Accordingly, the invention is not limited by the number of filters or fuel return tube displacement subassemblies.

What is claimed is:

1. A top loading filter assembly, comprising
a first fuel return tube displacement subassembly, comprising: a manifold, a first fuel return tube, a filter cartridge, a filter engaging member, and an actuating system, wherein:
the manifold comprises a body having a top side oppositely situated to a bottom side, and an open-ended first lateral side oppositely situated to a second lateral side, wherein the top side is oppositely situated to the bottom side and the first lateral side is oppositely situated to the second lateral side, and further wherein the body of the manifold comprises a chamber, wherein the open-ended first lateral side leads into the chamber;
the first fuel return tube comprises a generally cylindrical shaped body terminating at an open-ended first end and at an oppositely situated open-ended second end, wherein the body comprises a corrugated exterior, and wherein the first fuel return tube is disposed within the chamber of the manifold such that the first end of the first fuel return tube is directed towards the first lateral side of the manifold and the second end of the first fuel return tube is directed towards the second lateral side of the manifold;
the filter engaging member comprises an anterior end oppositely situated to a posterior end, wherein the anterior end is received within an opening formed in the bottom side of the manifold, and the posterior end of the filter engaging member is secured to the filter cartridge; and
the actuating system comprises:
an actuator having a shaft; and
a pinion;
wherein the shaft is in mechanical communication with the pinion such that when the shaft is actuated, the pinion moves over the corrugated exterior of the first fuel return tube thereby effectuating a translational movement of the first fuel return tube through the chamber of the manifold a mount, wherein the mount comprises a body having:
an open-ended top wall oppositely situated to an open-ended bottom wall;
an open-ended first side wall oppositely situated to a second side wall; and
a chamber, wherein the open-ended first side wall of the mount leads into the chamber of the mount;
wherein the body of the manifold is disposed within the chamber of the mount such that the bottom side of the manifold is directed towards the bottom wall of the mount, and such that the open-ended first end of the first fuel return tube is directed towards the open-ended first side wall of the mount.

2. The top loading filter assembly of claim 1, wherein the manifold further comprises a cavity formed therein, wherein the shaft and the pinion are disposed within the cavity, and further wherein the cavity is in fluid communication with the chamber of the manifold.

3. The top loading filter assembly of claim 2, wherein the actuator further comprises a head that is formed with the shaft, wherein the head overlies the top side of the manifold and wherein the shaft enters the cavity of the manifold via an opening formed on the top side of the manifold.

4. The top loading filter assembly of claim 3, wherein the pinion is disposed around the shaft.

5. The top loading filter assembly of claim 1, further comprising a filter housing having an open-ended anterior end oppositely situated to a posterior end, wherein the open-ended anterior end of the filter housing leads into a chamber formed within the filter housing, wherein when the first fuel return displacement subassembly is assembled to the mount, the filter cartridge is disposed in the chamber of the filter housing.

6. The top loading filter assembly of claim 5, wherein the anterior end of the filter housing is integrally formed with the mount.

7. The top loading filter assembly of claim 5, further comprising a filter controller comprising a manifold and a first collar, wherein the manifold of the filter controller comprises a chamber, and wherein the first collar is disposed within the chamber of the manifold, and further wherein the first collar is physically engaged with the first fuel return tube when the first fuel return tube is in an extended position and wherein the first collar is not physically engaged with the first fuel return tube when the first fuel return tube is in a retracted position.

8. The top loading filter assembly of claim 7, wherein, when the first fuel return tube is in a retracted position, the first fuel return tube displacement subassembly may be removed from the mount by lifting the subassembly in an upwards direction.

9. The top loading filter assembly of claim 8, further comprising a second fuel return tube displacement subassembly, wherein the second subassembly comprises: a manifold, a second fuel return tube, a filter cartridge, a filter engaging member, and an actuating system, wherein:
the manifold of the second subassembly comprises a body having a top side oppositely situated to a bottom side, and an open-ended first lateral side oppositely situated to a second lateral side, wherein the top side is oppositely situated to the bottom side and the first lateral side is oppositely situated to the second lateral side, and further wherein the body of the manifold of the second subassembly comprises a chamber, wherein the open-ended first lateral side leads into the chamber;
the second fuel return tube comprises a generally cylindrical shaped body terminating at an open-ended first end and at an oppositely situated open-ended second end, wherein the body comprises a corrugated exterior, and wherein the second fuel return tube is disposed within the chamber of the manifold of the second subassembly such that the first end of the second fuel return tube is directed towards the first lateral side of the manifold of the second subassembly and the second end of the second fuel return tube is directed towards the second lateral side of the manifold of the second subassembly;
the filter engaging member of the second subassembly comprises an anterior end oppositely situated to a posterior end, wherein the anterior end is received within an opening formed in the bottom side of the manifold of the second subassembly, and the posterior end of the filter engaging member is secured to the filter cartridge; and
the actuating system of the second subassembly comprises:
an actuator having a shaft; and
a pinion;
wherein the shaft is in mechanical communication with the pinion, such that when the shaft is actuated, the pinion moves over the corrugated exterior of the second fuel return tube thereby effectuating a translational movement of the second fuel return tube through the chamber of the manifold of the second subassembly.

10. The top loading filter assembly of claim 9, further comprising a second mount, wherein the second mount comprises a body having:
an open-ended top wall oppositely situated to an open-ended bottom wall;
an open-ended first side wall oppositely situated to a second side wall; and
a chamber, wherein the open-ended first side wall of the mount leads into the chamber of the second mount;
wherein the body of the manifold of the second subassembly is disposed within the chamber of the second mount such that the bottom side of the manifold is directed towards the bottom wall of the second mount, and such that the open-ended face of the second fuel return tube is directed towards the open-ended first side wall of the second mount.

11. The top loading filter assembly of claim 10, further comprising a second filter housing having an open-ended anterior end oppositely situated to a posterior end, wherein the open-ended anterior end of the second filter housing leads into a chamber formed within the second filter housing, wherein when the second fuel return tube displacement subassembly is assembled to the mount, the second filter cartridge is disposed in the chamber of the second filter housing.

12. The top loading filter assembly of claim 11, wherein the anterior end of the second filter housing is integrally formed with the second mount.

13. The top loading filter assembly of claim 12, wherein the filter controller further comprise a second collar wherein the second collar is disposed within the chamber of the manifold of the filter controller, and further wherein the second collar is physically engaged with the second fuel return tube when the second fuel return tube is in an extended position, and the second collar is not physically engaged with the second fuel return tube when the fuel return tube is in a retracted position.

14. The top loading filter assembly of claim 13, wherein, when the second fuel return tube is in a retracted position, the second fuel return tube displacement subassembly may be removed from the second mount by lifting the second subassembly in an upwards direction.

15. The top loading filter assembly of claim 14, wherein the filter controller comprises a conduit and a filter selection handle, wherein the filter selection handle is in operable communication with the conduit, and further wherein when the first fuel return tube is physically engaged with the first collar, the conduit is physically engaged with the first collar, and when the second fuel return tube is physically engaged with the second collar, the conduit is physically engaged with the second collar.

* * * * *